United States Patent Office.

DAVID N. CARVALHO, OF NEW YORK, N. Y., ASSIGNOR TO HIMSELF AND ERNEST MARX, OF SAME PLACE.

METHOD OF PRODUCING PHOTOGRAPHIC IMAGES.

SPECIFICATION forming part of Letters Patent No. 225,458, dated March 16, 1880.

Application filed June 16, 1879.

*To all whom it may concern:*

Be it known that I, DAVID NUNES CARVALHO, of the city, county, and State of New York, have invented certain new and useful Improvements in Producing Photographic Images, of which the following is a specification.

This invention relates to an improved method of producing photographic images, by which the time of exposure is shortened and rendered less annoying to the sitter, and by which superior negatives and positives are obtained, in which the high lights are stronger and the shadows softer, and by which, furthermore, less retouching is required than by the ordinary methods in use.

One of the main objects of the photographic art has been to produce with short exposure a full-timed negative. A number of complicated chemical processes have been devised for this purpose; but they have for some reason or other failed to give satisfaction, and have not worked to advantage.

The object of my invention is to supply to the photographer a simple, but very effective, method by which he is enabled to obtain with the common ordinary appliances and with a very short exposure a superior and full-timed negative. This result I have obtained by the operation of optical means, mainly, by discarding in the first place the hitherto generally adopted blue, black, or neutral colors for the interior of the photographic galleries, and substituting therefor a color that reflects rays of non-actinic quality; and, secondly, by employing for the sensitive film or coating of the glass plate collodion or other substratum of a color complementary to the predominating color of the surroundings.

I discovered accidentally that by working under a skylight glazed with uncolored glass, in a studio the walls of which had been painted in a brown color, it took considerably less time to make a negative than was required in the same room when the walls were painted with the orthodox blue color of photographic fame. In following up this experience by a series of experiments I discovered that by employing colors the reflected rays of which were supposed to have little or no actinic power the time of exposure required for a full-timed negative was more and more reduced.

Now, as, according to the laws of optics, an opaque body of a certain color, when exposed to light, absorbs the rays of its complementary color, but reflects rays of the same color, the above experiments led me to suppose that the blue rays reflected by the common blue color of the studios were instrumental in retarding, instead of accelerating, the formation of the picture on the sensitized plate, owing to the disturbing influence of the reflected blue rays on the rays reflected from the object to the plate. Thus the blue color heretofore used in the rooms, instead of shortening the exposure, exerted an unfavorable influence and prolonged the time of exposure. By employing, therefore, a color the reflected rays of which are supposed to be non-actinic these rays would exert no disturbing influence on the object to be photographed. In other words, the rays which are reflected from the object on the sensitized plate exert their full actinic power thereon, and produce, consequently, a better picture in less time.

It is also well known that the violet and violet-indigo rays of the spectrum are the most actinic, possessing in highest degree the power by which chemical changes are produced. A color complementary to violet would consequently reflect rays of least actinic power, and a paint of such complementary color, when used for the interior of the photographic galleries, instead of exerting a disturbing influence, would furnish reflected rays of a non-disturbing character and admit the quicker and more perfect development of the image on the sensitized plate, owing to the diminished interference of the reflected rays with the rays thrown from the object on the sensitized plate. I obtained the complementary color of violet by mixing Prussian blue and deep chrome in certain proportions, which mixture has a greenish-orange hue or tint, and resembles somewhat an orange pea-green. By applying a paint or other covering of this color to the interior of the skylight-room, excepting the glass, a full-timed negative was obtained with a considerable reduction of exposure as compared to the blue, brown, or other colors theretofore employed.

The good effects of the orange pea-green paint, by which the interior walls, joiner-work, &c., of the skylight-room were coated, induced me to continue my experiments with a view to a still further shortening of the time of exposure. I employed variously-colored collodions and baths, and found that by using a collodion and silver bath of a violet color complementary to the orange pea-green of the room the plate became more sensitive to the light. This is accomplished by coating the negative plate with a film of violet-colored collodion, after which the plate is sensitized in the usual manner in a bath which is also of violet color. It is then exposed to the action of the light in the camera.

The conjunction of the complementary colors of the walls, background, screens, &c., and of the sensitized plate neutralized the disturbing influences heretofore experienced and accelerated the chemical action of the rays reflected from the object to be photographed in such a manner that under favorable circumstances a full-timed negative was obtained by an instantaneous exposure merely, while under less favorable circumstances an exposure of a few seconds only was required. This favorable result, which is obtained simply by optical means, becomes more apparent when, in contradistinction to the complementary violet, a collodion and bath of the color of the room—viz., orange pea-green—is used, in which case, with the longest exposure and under most favorable conditions, only a dim outline of the object photographed was produced, no shadows whatever appearing, and only slight indications on the light side. Besides the reduction in this time of exposure it was found that the use of the orange pea-green color for the interior of the studio was less trying to the eyes of the sitter, which is readily explained by the fact that it contains green, the restoring color. The eye rests upon this photographic color with a feeling of satisfaction, and renders thus the sitting less objectionable than it was hitherto with the blue or gray color of the interior.

The absence of disturbing influences, such as cross-lights, dense shadows, &c., simplifies the work of the operator and enables him to produce with almost instantaneous exposure superior negatives, in which the high lights are more positive and the shadows softer.

The image is developed in the ordinary manner, and the negative thus obtained retains its violet color, so that the silver-paper used for printing purposes is more quickly affected by the light, and thereby a main desideratum of photographers—viz., a shortening of exposure and a saving of time in printing—obtained by cheap and exceedingly simple means.

The softening of the shadows is furthermore controlled by the interposition of a screen, which screen, owing to the orange pea-green color of the surroundings, throws a shadow of a complementary—that is, a violet—color on that part of sitter which is not exposed to the direct transmitted light of the gallery. The actinic character of the shadow thrown by the screen, when properly placed between sitter and the reflecting-surface, causes the shadows on the sensitized plate to be less dense—in other words, to be softer, and within perfect control of the operator.

Having thus described my invention, I claim as new and desire to secure by Letters Patent—

As an improvement in the art of photography, the described process of taking pictures with a view to softening the shadows and shortening exposures, which consists, essentially, in covering the walls, backgrounds, and other accessories of the operating-room or studio with an orange pea-green color, then coating the negative plate with a film of violet-colored collodion, then sensitizing the plate in a bath of violet color, and finally exposing said plate to the action of the light in the usual manner, substantially as set forth.

In testimony that I claim the foregoing as my invention I have signed my name, in presence of two witnesses, this 7th day of June, 1879.

DAVID NUNES CARVALHO.

Witnesses:
PAUL GOEPEL,
CARL KARP.